(12) United States Patent
Takeshita et al.

(10) Patent No.: US 7,402,348 B2
(45) Date of Patent: *Jul. 22, 2008

(54) PERPENDICULAR MAGNETIC RECORDING MEDIUM (75) Inventors: Hiroto Takeshita, Kawasaki (JP); Maki Maeda, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/088,241

(22) Filed: Mar. 23, 2005

(65) Prior Publication Data

US 2005/0249982 A1    Nov. 10, 2005

Related U.S. Application Data (63) Continuation of application No. PCT/JP2002/010779, filed on Oct. 17, 2002.

(51) Int. Cl.
*G11B 5/66* (2006.01)

(52) U.S. Cl. ............. 428/827; 428/829; 428/830; 428/216

(58) Field of Classification Search ............ None
See application file for complete search history.

(56) References Cited

U.S. PATENT DOCUMENTS

| | | | | |
|---|---|---|---|---|
| 4,966,821 | A * | 10/1990 | Kawashima et al. | 428/830 |
| 5,543,221 | A * | 8/1996 | Kitakami et al. | 428/332 |
| 6,362,910 | B1 | 3/2002 | Tokita | 359/180 |
| 6,403,203 | B2 | 6/2002 | Futamoto et al. | |
| 6,403,240 | B1 | 6/2002 | Kanbe et al. | 428/694 |
| 6,447,936 | B1 | 9/2002 | Futamoto et al. | |
| 6,534,164 | B2 | 3/2003 | Futamoto et al. | |
| 6,592,976 | B2 | 7/2003 | Futamoto et al. | |
| 6,596,418 | B2 | 7/2003 | Maesaka et al. | 428/694 |
| 6,596,420 | B2 | 7/2003 | Kanbe et al. | 428/694 |
| 6,607,849 | B2 | 8/2003 | Futamoto et al. | |
| 6,716,516 | B2 | 4/2004 | Futamoto et al. | |
| 6,893,746 | B1 * | 5/2005 | Kirino et al. | 428/827 |
| 6,903,905 | B2 | 6/2005 | Tanaka | 360/324.12 |
| 7,056,604 | B2 | 6/2006 | Kanbe et al. | 428/832 |
| 7,147,940 | B2 * | 12/2006 | Maeda et al. | 428/827 |
| 2001/0009730 | A1 * | 7/2001 | Futamoto et al. | 428/694 TM |
| 2002/0058160 | A1 | 5/2002 | Oikawa et al. | |

(Continued)

FOREIGN PATENT DOCUMENTS

EP     0809238 A2    11/1997

(Continued)

*Primary Examiner*—Kevin M Bernatz
(74) *Attorney, Agent, or Firm*—Greer, Burns & Crain, Ltd.

(57) ABSTRACT

A magnetic recording layer is formed on an auxiliary magnetic layer in a perpendicular magnetic recording medium. The auxiliary magnetic layer has the axis of easy magnetization in the vertical direction perpendicular to the surface of a substrate. The perpendicular magnetic recording medium reliably allows establishment of the magnetization in the auxiliary magnetic layer in the vertical direction. When a magnetic flux flows along the vertical direction perpendicular to the surface of the magnetic recording layer, the magnetic flux flows across the magnetic recording layer in the vertical direction. The magnetization is thus reliably established in the magnetic recording layer in the vertical direction. The magnetic field of a stronger intensity is thus leaked out of the magnetic recording layer in the vertical direction.

9 Claims, 7 Drawing Sheets

U.S. PATENT DOCUMENTS

2003/0228499 A1    12/2003    Maeda et al. ............... 428/695

FOREIGN PATENT DOCUMENTS

| | | |
|---|---|---|
| EP | 1249832 A1 | 10/2002 |
| JP | 05-028454 | 2/1993 |
| JP | 09-091660 | 4/1997 |
| JP | 10-228620 | 8/1998 |
| JP | 10-334440 | 12/1998 |
| JP | 2002-197620 | 7/1999 |
| JP | 11-102510 | 1/2002 |
| JP | 2002-100030 | 4/2002 |
| JP | 2002-025032 | 7/2002 |
| JP | 2002-216333 | 8/2002 |
| JP | 2002-222517 | 8/2002 |

* cited by examiner

PERPENDICULAR MAGNETIC RECORDING MEDIUM

This Application is a continuation of International Application No. PCT/JP2002/010779, filed Oct. 17, 2002.

BACKGROUND OF THE INVENTION

1. Field of the Invention

The present invention relates to a perpendicular magnetic recording medium in general employed in a magnetic recording medium drive such as a hard disk drive (HDD), for example.

2. Description of the Prior Art

A perpendicular magnetic recording medium is well known in the technical field of magnetic recording media such as hard disks. A soft magnetic underlayer is incorporated in the perpendicular magnetic recording medium. The underlayer is designed to receive a magnetic recording layer on a substrate. The underlayer is supposed to realize enlargement of the magnetization in the magnetic recording layer in the vertical direction perpendicular to the surface of the substrate when a magnetic field is applied from a so-called single-pole head. In fact, it is revealed that the underlayer is not effective to reinforce the magnetization in the magnetic recording layer in the vertical direction as expected.

SUMMARY OF THE INVENTION

It is accordingly an object of the present invention to provide a perpendicular magnetic recording medium reliably contributing to enlargement of the magnetization in the vertical direction perpendicular to the surface of a substrate.

According to the present invention, there is provided a perpendicular magnetic recording medium comprising: a substrate; a magnetic recording layer having the axis of easy magnetization in the vertical direction perpendicular to the surface of the substrate; an auxiliary magnetic layer receiving the magnetic recording layer, said auxiliary magnetic layer having the axis of easy magnetization in the vertical direction.

The perpendicular magnetic recording medium reliably allows establishment of the magnetization in the auxiliary magnetic layer in the vertical direction. When a magnetic flux flows along the vertical direction perpendicular to the surface of the magnetic recording layer, the magnetic flux flows across the magnetic recording layer in the vertical direction. The magnetization is thus reliably established in the magnetic recording layer in the vertical direction. The magnetic field of a stronger intensity is thus leaked out of the magnetic recording layer in the vertical direction. In particular, the magnetic recording layer allows the magnetic flux to get intensified along the boundary between the adjacent magnetizations.

The auxiliary magnetic layer preferably has a coercivity smaller than that of the magnetic recording layer. In particular, the product of the thickness and the residual magnetic flux density for the auxiliary magnetic layer is preferably set equal to or smaller than one fifth the product of the thickness and the residual magnetic flux density for the magnetic recording layer. This contributes to a reliable suppression of leakage of magnetic field from the auxiliary magnetic layer. The influence of the auxiliary magnetic layer is thus avoided when the magnetic information data is to be read out. The auxiliary magnetic layer may be made of a layered material including a magnetic film containing at least Co and a non-magnetic film containing at least an element selected from a group consisting of Pt, Pd, Au and Ag.

The perpendicular magnetic recording medium may further comprise a soft magnetic underlayer receiving the auxiliary magnetic layer. The underlayer has the axis of easy magnetization in the planar direction parallel to the surface of the substrate. When a single-pole head is opposed to the perpendicular magnetic recording medium, for example, the magnetic flux circulates through the primary pole of the single-polehead, the soft magnetic underlayer, and the auxiliary pole of the single-pole head, as conventionally known. The magnetic flux flows from the tip end of the primary pole to the underlayer in the vertical direction. The magnetic flux thereafter flows in the planar direction in the underlayer. The magnetic flux then flows from the underlayer to the auxiliary pole in the vertical direction. In this manner, the magnetization is surely established in the vertical direction in the magnetic recording layer.

Otherwise, the perpendicular magnetic recording medium may further comprise: a non-magnetic layer receiving the auxiliary magnetic layer; and a soft magnetic underlayer receiving the non-magnetic layer. The underlayer has the axis of easy magnetization in the planar direction parallel to the surface of the substrate. The soft magnetic underlayer serves to set the magnetization in the vertical direction in the magnetic recording layer in the perpendicular magnetic recording medium in the same manner as described above. Moreover, the non-magnetic layer interposed between the auxiliary magnetic layer and the underlayer serves to prevent a magnetic interaction between the auxiliary magnetic layer and the underlayer. Avoidance of the magnetic interaction in this manner contributes to a reliable reproduction of the magnetic information data.

The perpendicular magnetic recording medium may be utilized in a hard disk drive (HDD), and any other types of a magnetic recording medium drive.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
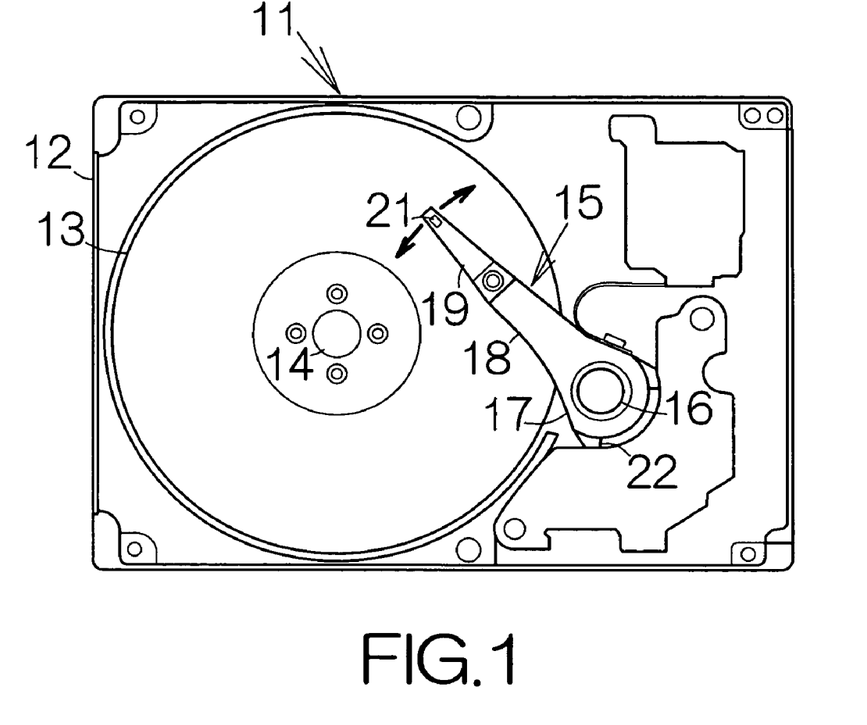
FIG. 1 is a plan view schematically illustrating the structure of a hard disk drive (HDD) as an example of a magnetic recording medium drive.

FIG. 1 schematically illustrates the inner structure of a hard disk drive (HDD) 11 as an example of a recording medium drive or storage device. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk or disks 13 for rotation at a higher revolution speed such as 7,200 rpm or 10,000 rpm, for example. A cover, not shown, is coupled to the main enclosure 12 so as to define the closed inner space between the main enclosure 12 and itself.

A head actuator 15 is also incorporated within the inner space of the main enclosure 12. The head actuator 15 includes an actuator block 17 supported on a vertical support shaft 16 for rotation. Rigid actuator arms 18 are defined in the actuator block 17. The actuator arms 18 are designed to extend in a horizontal direction from the vertical support shaft 16. The actuator arms 18 are associated with the front and back surfaces of the magnetic recording disk or disks 13, respectively. The actuator block 17 may be made of aluminum. Molding process may be employed to form the actuator block 17.

Elastic head suspensions 19 are fixed to the tip ends of the actuator arms 18. The individual head suspension 19 is designed to extend forward from the corresponding tip end of the actuator arm 18. As conventionally known, a flying head slider 21 is supported on the front end of the individual head suspension 19. The flying head sliders 21 are related to the actuator block 17 in this manner. The flying head sliders 21 are opposed to the surfaces of the magnetic recording disk or disks 13.

An electromagnetic transducer, not shown, is mounted on the flying head slider 21. The electromagnetic transducer may include a read element such as a giant magnetoresistive (GMR) element or a tunnel-junction magnetoresistive (TMR) element, and a write element such as a thin film magnetic head. The GMR or TMR element is designed to discriminate magnetic bit data on the magnetic recording disk 13 by utilizing variation in the electric resistance of a spin valve film or a tunnel-junction film. The thin film magnetic head is designed to write magnetic bit data into the magnetic recording disk 13 by utilizing a magnetic field induced at a thin film coil pattern.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force of the head suspension 19.

A power source 22 such as a voice coil motor (VCM) is connected to the actuator block 17. The power source 22 drives the actuator block 17 for rotation around the support shaft 16. The rotation of the actuator block 17 induces the swinging movement of the actuator arms 18 and the head suspensions 19. When the actuator arm 18 is driven to swing about the support shaft 16 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. As conventionally known, in the case where two or more magnetic recording disks 13 are incorporated within the inner space of the main enclosure 12, a pair of the elastic head suspension 19 and a pair of the actuator arm 18 are disposed between the adjacent magnetic recording disks 13.

Figure 2:
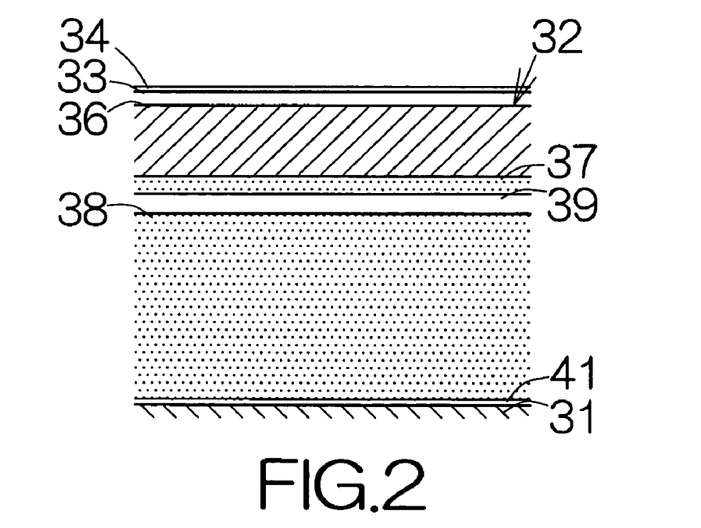
FIG. 2 is an enlarged vertical sectional view illustrating the structure of a magnetic recording disk in detail.

FIG. 2 illustrates a sectional view, taken along a plane parallel to the rotational axis of the magnetic recording disk 13. The magnetic recording disk 13 includes a substrate 31 as a support member, and layered structure films 32 extending over the front and back surfaces of the substrate 31, respectively. The substrate 31 may be a disk-shaped glass substrate, for example. Alternatively, the substrate 31 may comprise a disk-shaped aluminum (Al) body and NiP laminations covering over the front and back surfaces of the Al body. Magnetic information data is recorded in the layered structure films 32. The layered structure film 32 is covered with a carbon protection overcoat 33, such as a diamond-like-carbon film, and a lubricating agent film 34, such as a perfluoropolyether film.

The layered structure film 32 includes a magnetic recording layer 36. The axis of easy magnetization in the magnetic recording layer 36 is set in the vertical direction perpendicular to the surface of the substrate 31. Layered ultra thin films may be utilized as the magnetic recording layer 36 for establishing the axis of easy magnetization as mentioned above, for example. Magnetic films and non-magnetic films are alternately overlaid one another in the layered ultra thin films. The magnetic film may be a CoBO film having a thickness of 0.3 nm approximately, for example. The non-magnetic film may be a PdO film having a thickness of 1.0 nm approximately, for example. Here, the magnetic recording layer 36 includes twenty of CoBO films and twenty of PdO films alternately overlaid one another. Magnetic information data is recorded in the magnetic recording layer 36.

The magnetic recording layer 36 is received on the surface of an auxiliary magnetic layer 37. The axis of easy magnetization in the auxiliary magnetic layer 37 is set in the vertical direction perpendicular to the surface of the substrate 31. Layered ultra thin films may be utilized as the auxiliary magnetic layer 37 for establishing the axis of easy magnetization as mentioned above, for example. Magnetic films and non-magnetic films are alternately overlaid one another in the layered ultra thin films. The magnetic film may be a Co film, a film made of an alloy containing Co, or the like, for example. The thickness of the individual magnetic film may be set at 0.5 nm approximately, for example. The non-magnetic film may be a Au film having a thickness of 0.7 nm approximately, for example. Here, the auxiliary magnetic layer 37 includes four of Co films and four of Au films alternately overlaid one another.

The coercivity of the auxiliary magnetic layer 37 is set smaller than that of the magnetic recording layer 36. In addition, the auxiliary magnetic layer 37 preferably has a tendency to easily get magnetized in the vertical direction rather than the magnetic recording layer 36. Accordingly, the coercivity of the auxiliary magnetic layer 37 may be set equal to or smaller than 40 [kA/m]. The coercive squareness ratio may be set equal to or larger than 0.9 in the auxiliary magnetic layer 37. Moreover, the product tBr of the thickness t and the residual magnetic flux density Br for the auxiliary magnetic layer 37 is preferably set equal to or smaller than one fifth the product tBr of the thickness t and the residual magnetic flux density Br for the magnetic recording layer 36.

The auxiliary magnetic layer 37 is received on the surface of a soft magnetic underlayer 38. The underlayer 38 may be made of a soft magnetic material such as FeTaC, for example. The axis of easy magnetization in the underlayer 38 is set in the planar direction parallel to the surface of the substrate 31. The underlayer 38 preferably has a permeability equal to or larger than 100. As is apparent from FIG. 2, a non-magnetic layer 39 may be interposed between the auxiliary magnetic layer 37 and the underlayer 38. The non-magnetic layer 39 may be made of a non-magnetic metallic material such as Pd, for example.

The underlayer 38 is received on the surface of the substrate 31. A cohesion layer 41 may be interposed between the underlayer 38 and the substrate 31. The cohesion layer 41 may be made of a metallic material such as Ta, for example. The cohesion layer 41 serves to improve the cohesion between the underlayer 38 and the substrate 31.

Figure 3:
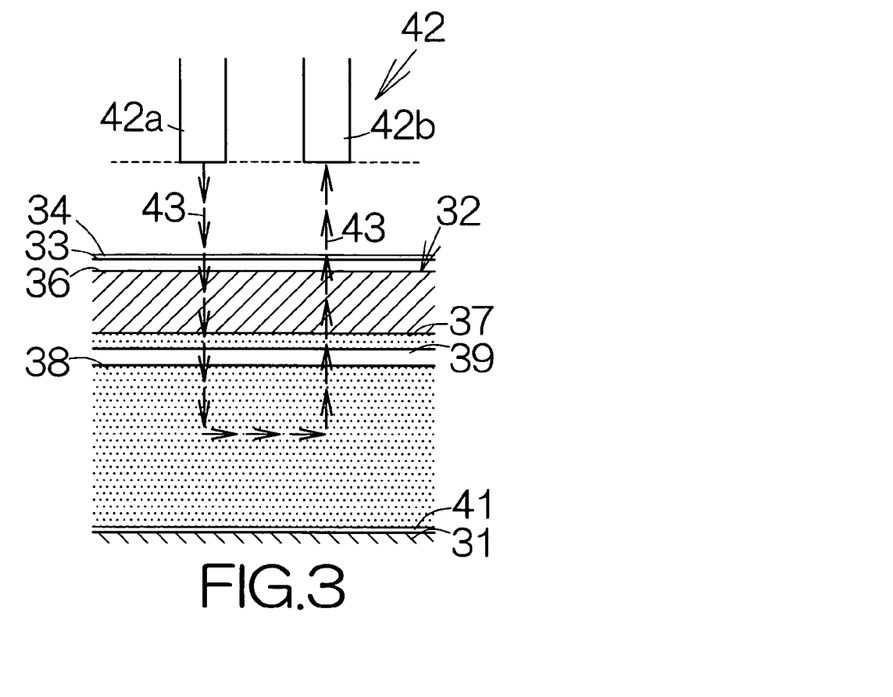
FIG. 3 is an enlarged partial sectional view schematically illustrating the flow of a magnetic flux through a single-pole head and a soft magnetic underlayer.

Now, assume that magnetic information data is to be written into the magnetic recording disk 13. As shown in FIG. 3, a single-pole head 42 is employed to write magnetic information data. The single-pole head 42 includes a primary pole 42a and an auxiliary pole 42b both opposed to the surface of the magnetic recording disk 13. The magnetic flux circulates through the primary pole 42a, the underlayer 38 and the auxiliary pole 42b.

For example, the magnetic flux 43 leaked out of the tip end of the primary pole 42a is led to the underlayer 38 along the vertical direction perpendicular to the surface of the substrate 31. The magnetic flux 43 flows in the underlayer 38 in the planar direction parallel to the surface of the substrate 31. The magnetic flux 43 thereafter flows from the underlayer 38 to the auxiliary pole 42b along the vertical direction. In this manner, the magnetization is established in the magnetic recording layer 36 in the vertical direction.

Since the magnetization is established in the vertical direction in the auxiliary magnetic layer 37, the magnetic flux is allowed to reliably flow in the vertical direction in the magnetic recording layer 36. The magnetization is established in the vertical direction across the magnetic recording layer 36. The magnetic flux of a strong intensity is thus leaked out of the magnetic recording layer 36 in the vertical direction. In particular, the magnetic recording layer 36 allows the magnetic flux to get intensified along the boundary between the adjacent magnetizations. On the other hand, if the magnetic recording layer 36 is received on the soft magnetic underlayer 38 in a conventional manner, the magnetization tends to deviate from the vertical direction at a location closer to the underlayer 38. The magnetic flux leaked out of the magnetic recording layer 36 gets reduced.

Moreover, the product tBr of the thickness t and the residual magnetic flux density Br for the auxiliary magnetic layer 37 is set equal to or smaller than one fifth the product tBr of the thickness t and the residual magnetic flux density Br for the magnetic recording layer 36. The leakage of the magnetic flux is suppressed out of the auxiliary magnetic layer 37. The influence of the auxiliary magnetic layer 37 is thus avoided when the magnetic information data is to be read. If the magnetic flux of a strong intensity is leaked out of the auxiliary magnetic layer 37, the magnetic flux from the auxiliary magnetic layer 37 overrides on the magnetic flux from the magnetic recording layer 36. The reproduction of the magnetic information data may be hindered.

Furthermore, the non-magnetic layer 39 interposed between the auxiliary magnetic layer 37 and the underlayer 38 serves to prevent a magnetic interaction between the auxiliary magnetic layer 37 and the underlayer 38. This contributes to a reliable reproduction of the magnetic information data. If a strong magnetic interaction acts between the auxiliary magnetic layer 37 and the underlayer 38, the magnetic flux from the magnetic recording layer 36 suffers from a magnetic influence from the auxiliary magnetic layer 38. The reproduction of the magnetic information data may be hindered.

Next, a brief description will be made on a method of making the magnetic recording disk 13. The disk-shaped substrate 31 is first prepared. The substrate 31 is set in a sputtering apparatus, for example. The layered structure film 32 is then formed on the surface of the substrate 31 in the sputtering apparatus. The detailed process will be described later. The carbon protection overcoat 33 having a thickness of 4.0 nm approximately is formed on the surface of the layered structure film 32. Chemical vapor deposition, CDV, may be employed to form the carbon protection overcoat 33. The lubricating agent film 34 having a thickness of 1.0 nm is then applied to the surface of the carbon protection overcoat 33. The substrate 31 may be dipped into a solution containing perfluoropolyether, for example.

Figure 4:
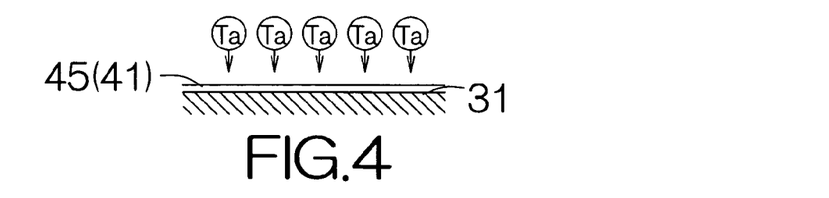
FIG. 4 is an vertical partial sectional view of a substrate for schematically illustrating the process of forming a cohesion layer.

DC magnetron sputtering is utilized to form the layered structure film 32 in the sputtering apparatus. As shown in FIG. 4, the cohesion layer 41, namely a Ta layer 45 is first formed on the surface of the substrate 31. A Ta target is set in the sputtering apparatus. Ta atoms are allowed to deposit on the surface of the substrate 31. The thickness of the Ta layer 45 is set at 1.0 nm approximately, for example.

Figure 5:
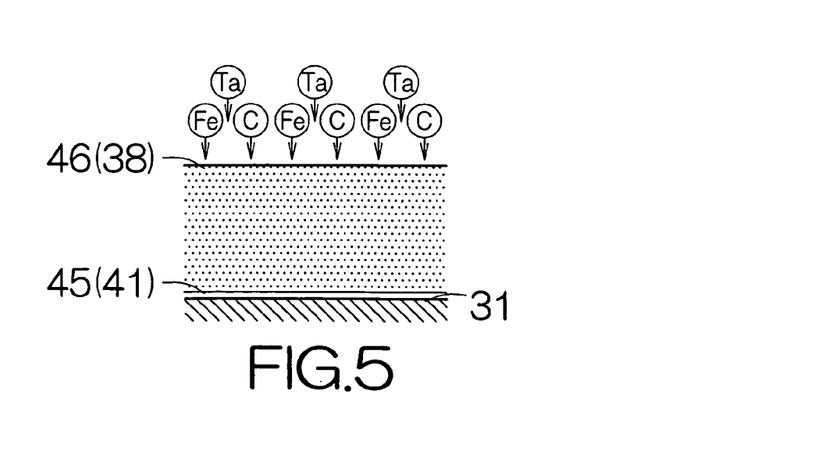
FIG. 5 is an vertical partial sectional view of the substrate for schematically illustrating the process of forming the soft magnetic underlayer.

As shown in FIG. 5, the underlayer 38, namely a FeTaC layer 46 is formed on the surface of the Ta layer 45. A FeTaC target is set in the sputtering apparatus. Fe atoms, Ta atoms and C atoms are allowed to deposit on the surface of the Ta layer 45. The thickness of the FeTaC layer 46 is set at 300 nm approximately.

Figure 6:
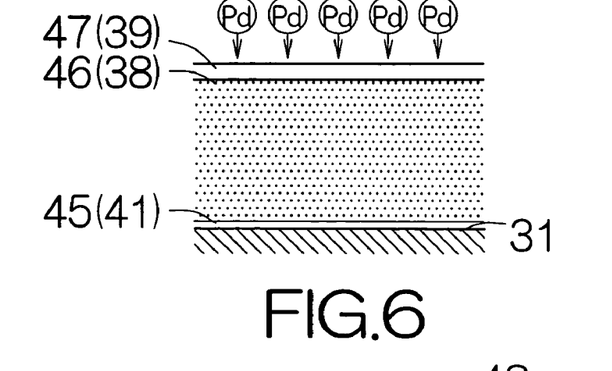
FIG. 6 is an vertical partial sectional view of the substrate for schematically illustrating the process of forming a non-magnetic layer.

As shown in FIG. 6, the non-magnetic layer 39, namely a Pd layer 47 is thereafter formed on the surface of the FeTaC layer 46. A Pd target is set in the sputtering apparatus. Pd atoms are allowed to deposit on the surface of the FeTaC layer 46. The thickness of the Pd layer 47 is set at 5.0 nm approximately, for example.

Figure 7:
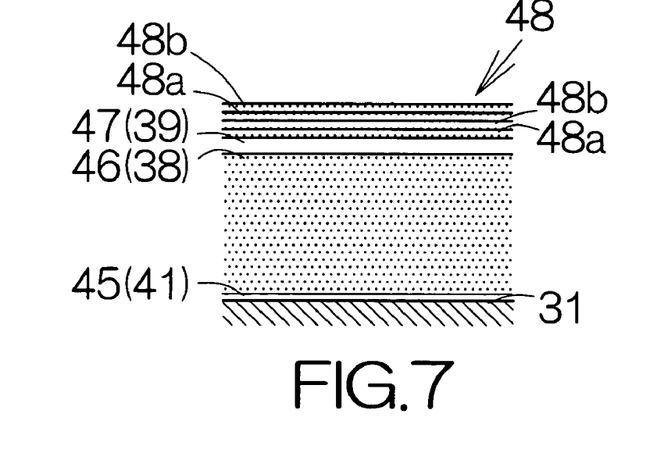
FIG. 7 is an vertical partial sectional view of the substrate for schematically illustrating the process of forming an auxiliary magnetic layer.

As shown in FIG. 7, the auxiliary magnetic layer 37, namely a layered structure 48 including ultra thin films are then formed on the surface of the Pd layer 47. Co layers 48a each having the thickness of 0.5 nm approximately and Au layers 48b each having the thickness of 0.7 nm approximately are alternately formed. The formation of the Co layer 38a and the Au layer 38b is repeated four times. In this manner, the layered structure 48 is formed to include eight layers.

Figure 8:
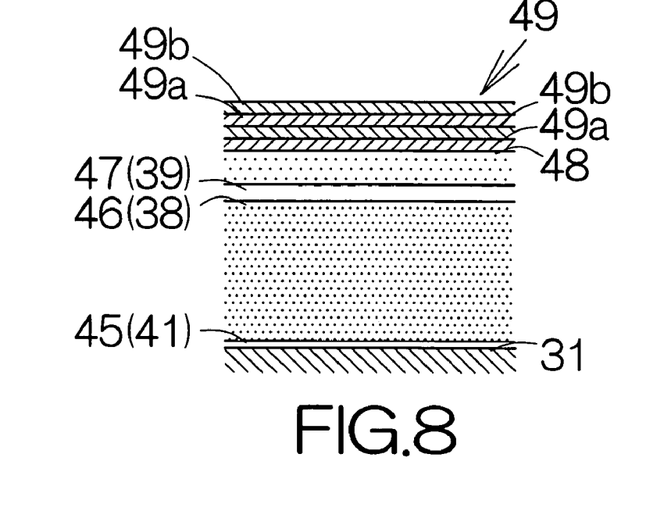
FIG. 8 is an vertical partial sectional view of the substrate for schematically illustrating the process of forming a magnetic recording layer.

As shown in FIG. 8, the magnetic recording layer 36, namely a layered structure 49 including ultra thin films are subsequently formed on the surface of the layered structure 48. CoBO layers 49a each having the thickness of 0.3 nm approximately and PdO layers 49b each having the thickness of 1.0 nm approximately are alternately formed. Here, the formation of the CoBO layer 49a and the PdO layer 49b is repeated twenty times. In this manner, the layered structure 49 is formed to include forty layers.

The inventors have observed the characteristics of the magnetic recording disk 13 made as mentioned above. Magnetic information data was written into the magnetic recording disk 13 in the observation. A single-pole head was employed to write the magnetic information data. The written magnetic information data was then read out of the magnetic recording disk 13. A spin valve magnetoresistive head was employed to read the magnetic information data. The single-pole head and the spin valve magnetoresistive head were mounted on the flying head slider 21 as mentioned above. The flying height of the flying head slider 21 was set at 15.0 nm. A relative velocity was set at 10.0 m/sec between the flying head slider 21 and the magnetic recording disk 13.

The inventors also prepared a comparative example. The aforementioned auxiliary magnetic layer 37 was omitted from the comparative example. Specifically, the magnetic recording layer 36 was overlaid on the surface of the underlayer 38 in a conventional manner. Other structure was set identical to that of the magnetic recording disk 13 according to the embodiment of the present invention.

Figure 9:
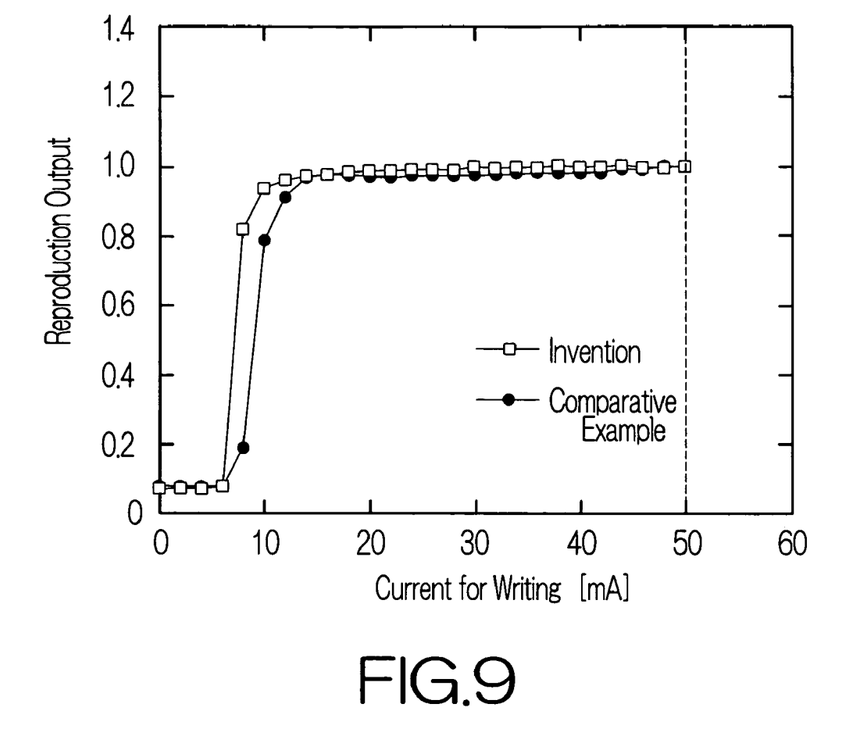
FIG. 9 is a graph showing the relationship between the current value of a current for writing and the reproduction output.

The inventors have varied the current value of a current supplied to a coil pattern of the single-pole head. The magnetic information data was written at the linear recording density of 440 [kFCI]. A reference level [1.0] was set in the reproduction output. A current having the current value of 50 [mA] was supplied to the single-pole head for establishing the reference level [1.0] of the reproduction output. The reproduction output was measured for the various current values. As shown in FIG. 9, the magnetic recording disk 13 according to the embodiment of the present invention enables establishment of reference level [1.0] for the reproduction output even with a smaller current value as compared with the magnetic recording disk of the comparative example.

Figure 10:
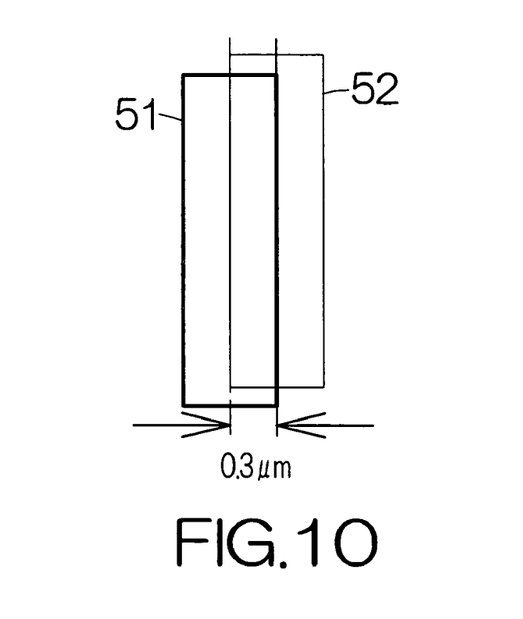
FIG. 10 is an enlarged partial plan view schematically illustrating the concept of recording tracks established for observation of distribution for a magnetic field.

Next, the inventors have observed the distribution of the magnetic field based on a written magnetic information data. A pair of recording track 51, 52 was established on the magnetic recording disk in the observation, as shown in FIG. 10. The magnetic information data was written at the linear recording density of 110 [kFCI] on the recording track 51. The current value was set at 30 [mA]. Likewise, the magnetic information data was written at the linear recording density of 440 [kFCI] on the recording track 52. Various current values were set for the current supplied to the single-pole head. The core width of the single-pole head was set at 0.6 μm. A distance was set at 0.3 μm between the adjacent recording tracks 51, 52.

Figure 11:
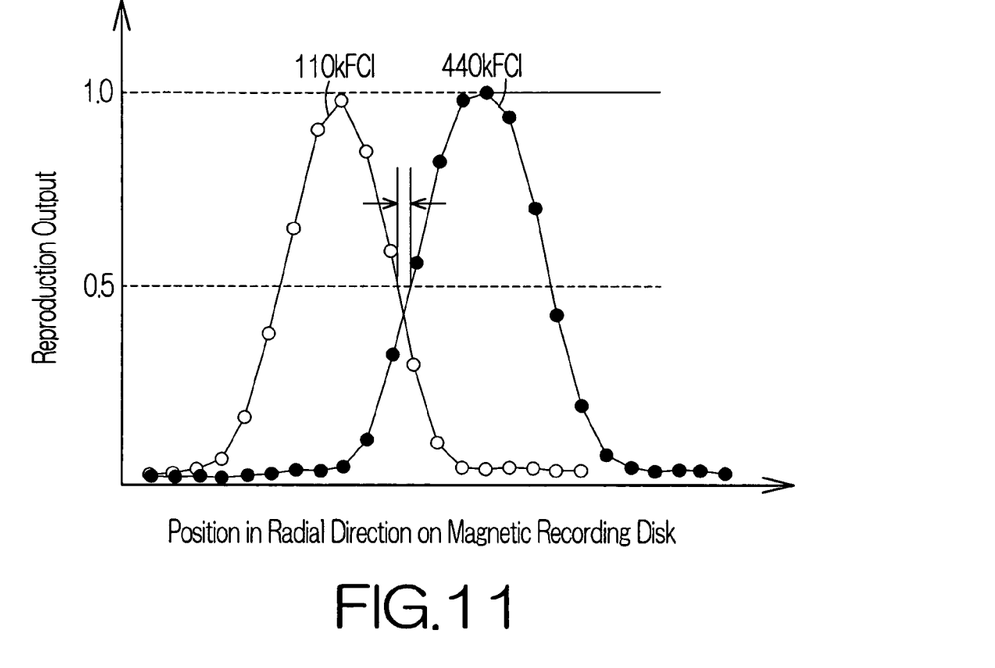
FIG. 11 is a graph showing the distribution for a magnetic field for schematically illustrating the concept of "side erase width"

The magnetic information data was read out along the recording tracks 51, 52. A spectrum analyzer was employed to measure the reproduction output. As shown in FIG. 11, a reference level [1.0] was set at the maximum reproduction output. Half the reference level [1.0], namely the level [0.5], was also identified for the reproduction output of the recording tracks 51, 52. The space at the level [0.5] between the reproduction output curves for the adjacent recording tracks 51, 52 was defined as "side erase width."

Figure 12:
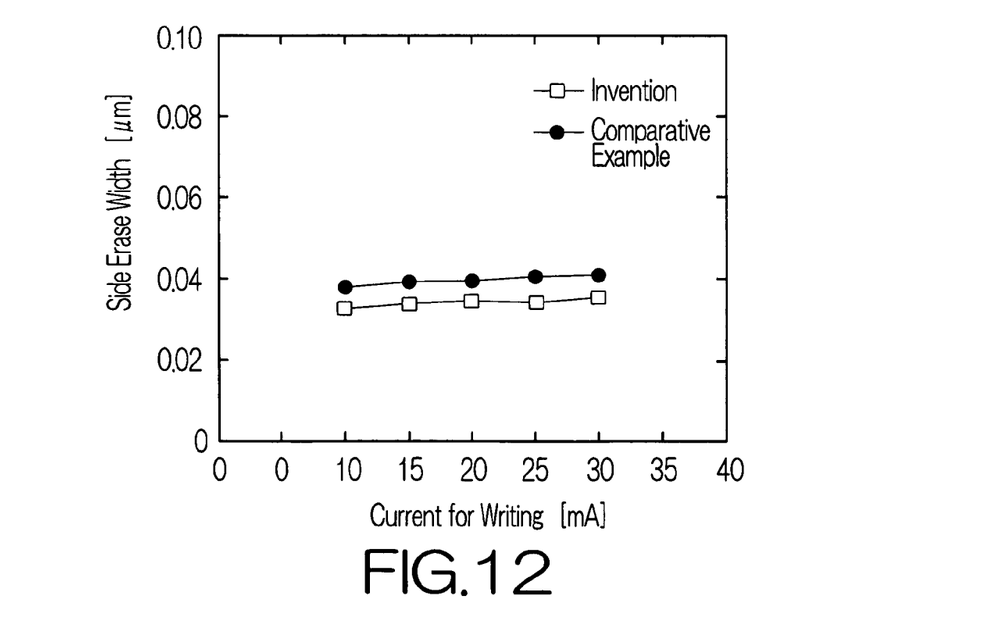
FIG. 12 is a graph showing the relationship between the current value and the side erase width.

As shown in FIG. 12, the magnetic recording disk 13 of the embodiment was verified to enjoy a smaller side erase width, irrespective of the magnitude of the current, as compared with the magnetic recording disk of the comparative example. Specifically, the magnetic recording disk 13 of the embodiment is allowed to surely enjoy a magnetic field of a strong intensity along the boundary between the adjacent recording tracks.

Figure 13:
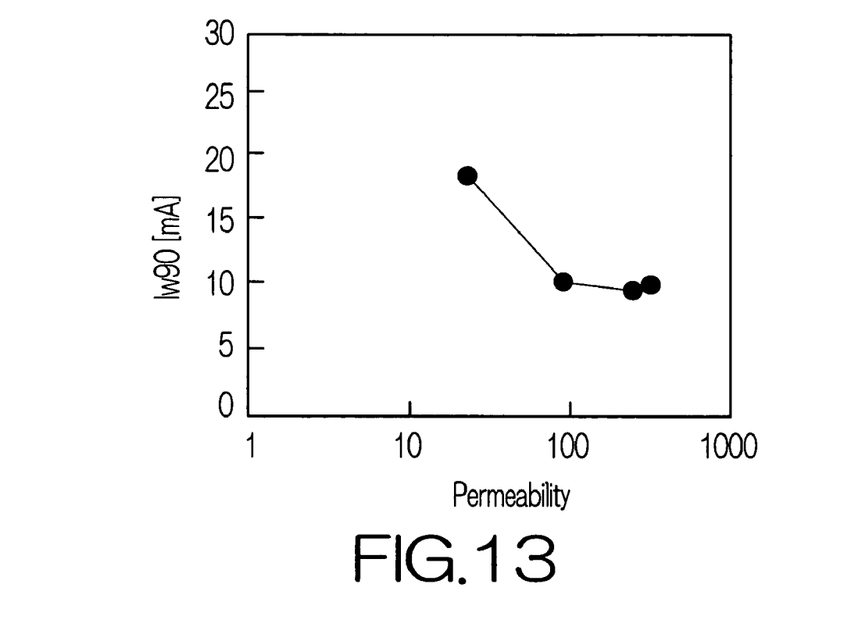
FIG. 13 is a graph showing the relationship between the current value Iw90 and the permeability of the soft magnetic underlayer.

Next, the inventors have observed the relationship between the reproduction output and the permeability of the underlayer 38. The inventors have prepared various magnetic recording disks 13. Various permeability was set for the underlayers 38 in the individual magnetic recording disks 13. Various current values were set for the current supplied to the single-pole head for writing the magnetic information data into the magnetic recording disks 13. Here, the saturation values were measured for the reproduction output. The current value (Iw90) was identified for the reproduction output at 90% of the saturation value. As is apparent from FIG. 13, the permeability equal to or larger than 100 in the underlayer 38 enables establishment of the magnetization in the magnetic recording layer 36 even with a smaller current value.

Figure 14:
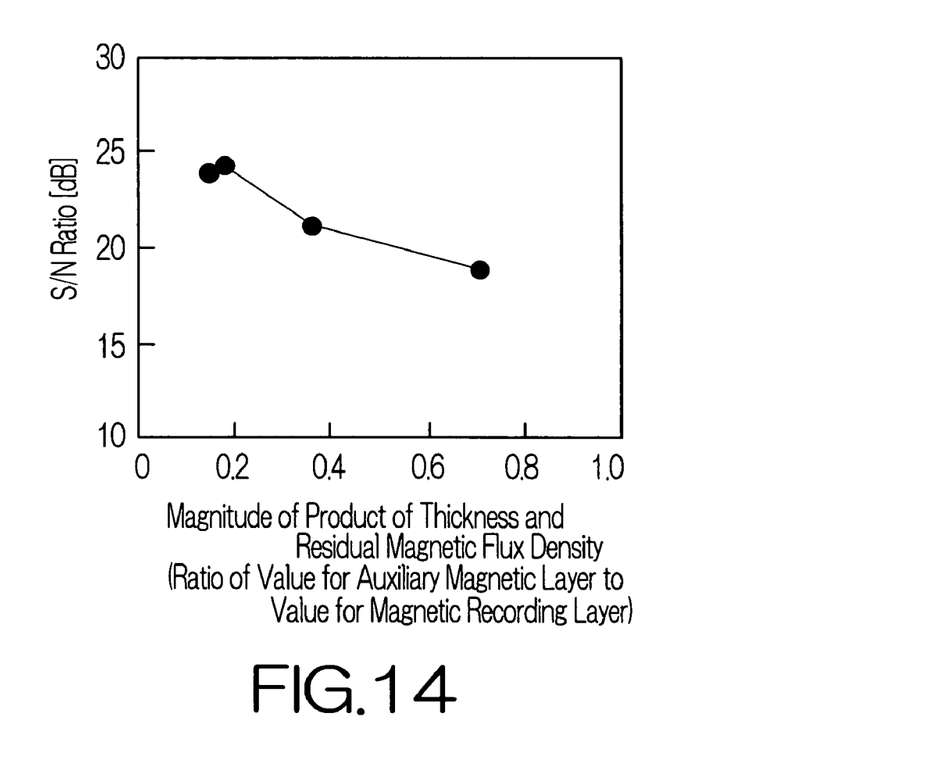
FIG. 14 is a graph showing the relationship between the S/N ratio and the magnitude of the product of thickness and residual magnetic flux density.

Next, the inventors have measured the S/N ratio of the magnetic recording disk 13 according to the embodiment. The inventors prepared various magnetic recording disks 13. Various products of the thickness and the residual magnetic flux density were set for the magnetic recording layers 36 in the individual magnetic recording disks 13. Magnetic information data was written at the linear recording density of 300 [kFCI]. As is apparent from FIG. 14, when the product of the thickness and the residual magnetic flux density for the auxiliary magnetic layer 37 is set equal to or smaller than one fifth the product of the thickness and the residual magnetic flux density for the magnetic recording layer 36, a superior S/N ratio can be obtained. Here, the thickness of the auxiliary magnetic layer 37 was set at 4.8 nm in the individual magnetic recording disks 13. The coercivity of the auxiliary magnetic layer 37 was kept between 14.3 [kA/m] and 19.1 [kA/m] in the individual magnetic recording disks 13. The coercive squareness ratio was kept between 0.92 and 0.96 for the auxiliary magnetic layers 37 in the individual magnetic recording disks 13.

Figure 15:
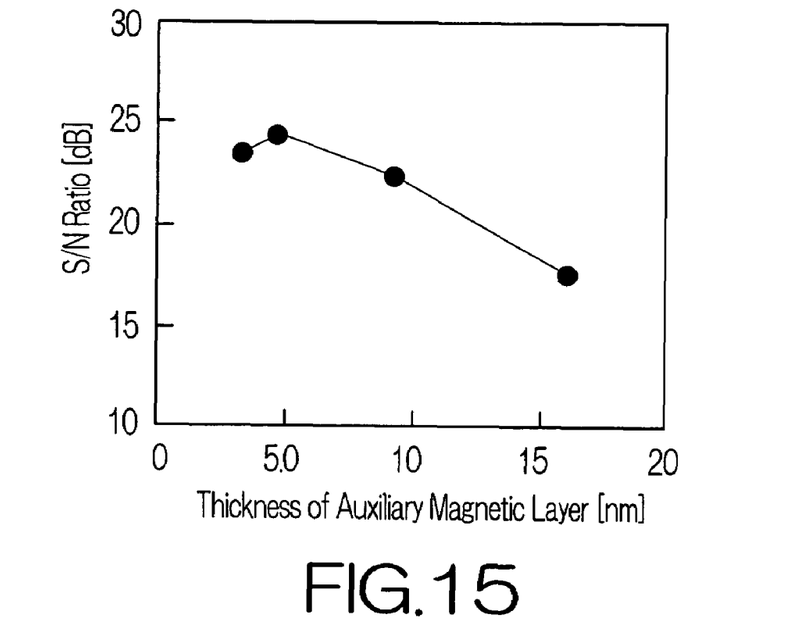
FIG. 15 is a graph showing the relationship between the S/N ratio and the thickness of the auxiliary magnetic layer.

Furthermore, the inventors have measured the S/N ratio of the magnetic recording disk 13 according to the embodiment. The inventors prepared various magnetic recording disks 13. Various thicknesses were set for the auxiliary magnetic layers 37 in the individual magnetic recording disks 13. The other conditions were set as the aforementioned measurement. As shown in FIG. 15, when the thickness of the auxiliary magnetic layer 37 was set equal to or smaller than 5.0 nm, a superior S/N ratio was obtained.

Figure 16:
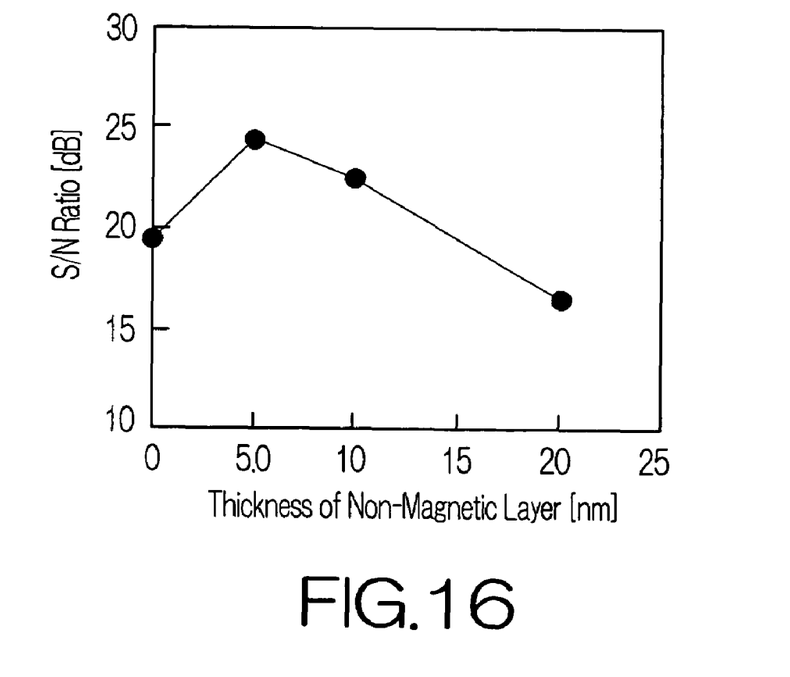
FIG. 16 is a graph showing the relationship between the S/N ratio and the thickness of the non-magnetic layer.

Furthermore, the inventors have measured the S/N ratio of the magnetic recording disk 13 according to the embodiment. The inventors prepared various magnetic recording disks 13. Various thicknesses were set for the non-magnetic layers 39 in the individual magnetic recording disks 13. The other conditions were set as the aforementioned measurement. As shown in FIG. 16, when the thickness of the non-magnetic layer 39 was set at 5.0 nm approximately, a superior S/N ratio was obtained.

What is claimed is:

1. A perpendicular magnetic recording medium comprising:
   a substrate;
   a magnetic recording layer having an axis of easy magnetization in a vertical direction perpendicular to a surface of the substrate; and
   an auxiliary magnetic layer receiving the magnetic recording layer, said auxiliary magnetic layer having an axis of easy magnetization in the vertical direction, wherein a product of a thickness and a residual magnetic flux density for said auxiliary magnetic layer is set equal to or smaller than one fifth a product of a thickness and a residual magnetic flux density for the magnetic recording layer.

2. The perpendicular magnetic recording medium according to claim 1, wherein said auxiliary magnetic layer has a coercivity smaller than that of the magnetic recording layer.

3. The perpendicular magnetic recording medium according to claim 1, wherein said auxiliary magnetic layer is made of a layered material including a magnetic film containing at least Co and a non-magnetic film containing at least an element selected from a group consisting of Pt, Pd, Au and Ag.

4. The perpendicular magnetic recording medium according to claim 1, further comprising a soft magnetic underlayer receiving the auxiliary magnetic layer, said underlayer having an axis of easy magnetization in a planar direction parallel to the surface of the substrate.

5. The perpendicular magnetic recording medium according to claim 4, wherein said auxiliary magnetic layer has a coercivity smaller than that of the magnetic recording layer.

6. The perpendicular magnetic recording medium according to claim 5, wherein said auxiliary magnetic layer is made of a layered material including a magnetic film containing at least Co and a non-magnetic film containing at least an element selected from a group consisting of Pt, Pd, Au and Ag.

7. The perpendicular magnetic recording medium according to claim 1, further comprising:
    a non-magnetic layer receiving the auxiliary magnetic layer; and
    a soft magnetic underlayer receiving the non-magnetic layer, said underlayer having an axis of easy magnetization in a planar direction parallel to the surface of the substrate.

8. The perpendicular magnetic recording medium according to claim 7, wherein said auxiliary magnetic layer has a coercivity smaller than that of the magnetic recording layer.

9. The perpendicular magnetic recording medium according to claim 8, wherein said auxiliary magnetic layer is made of a layered material including a magnetic film containing at least Co and a non-magnetic film containing at least an element selected from a group consisting of Pt, Pd, Au and Ag.

* * * * *